(12) United States Patent
Keohane et al.

(10) Patent No.: US 11,507,769 B2
(45) Date of Patent: Nov. 22, 2022

(54) INTERPRETING SENSOR TRANSMISSION PATTERNS TO ANALYZE ANOMALIES IN A SMART ENVIRONMENT

(71) Applicant: International Business Machines Corporation, Armonk, NY (US)

(72) Inventors: Susann Marie Keohane, Austin, TX (US); Scott Gerard, Wake Forest, NC (US); Aliza Heching, Bronx, NY (US); Samuel Scott Adams, Rutherfordton, NC (US); Mohammad Arif Ul Alam, Quincy, MA (US)

(73) Assignee: International Business Machines Corporation, Armonk, NY (US)

( * ) Notice: Subject to any disclaimer, the term of this patent is extended or adjusted under 35 U.S.C. 154(b) by 1015 days.

(21) Appl. No.: 16/217,288

(22) Filed: Dec. 12, 2018

(65) Prior Publication Data
US 2020/0193155 A1    Jun. 18, 2020

(51) Int. Cl.
| | |
|---|---|
| *G06K 9/00* | (2022.01) |
| *G16Y 40/10* | (2020.01) |
| *G16Y 40/20* | (2020.01) |
| *G16Y 40/50* | (2020.01) |
| *G06N 5/04* | (2006.01) |
| *G06N 20/00* | (2019.01) |

(52) U.S. Cl.
CPC ........... *G06K 9/00496* (2013.01); *G06N 5/04* (2013.01); *G06N 20/00* (2019.01); *G16Y 40/10* (2020.01); *G16Y 40/20* (2020.01); *G16Y 40/50* (2020.01)

(58) Field of Classification Search
CPC .... G06K 9/00496; G06N 20/00; G16Y 40/10; G16Y 40/20; G16Y 40/50
See application file for complete search history.

(56) References Cited

U.S. PATENT DOCUMENTS

| | | | |
|---|---|---|---|
| 7,552,030 B2 | 6/2009 | Guralnik et al. | |
| 2010/0302043 A1 | 12/2010 | Skubic et al. | |
| (Continued) | | | |

OTHER PUBLICATIONS

Munir et al., "FailureSense: Detecting Sensor Failure using Electrical Appliances in the Home" 2014 IEEE 11th International Conference on Mobile Ad Hoc and Sensor Systems (Year: 2014).*

(Continued)

*Primary Examiner* — John C Kuan
(74) *Attorney, Agent, or Firm* — Cantor Colburn LLP; Brian Welle (57) ABSTRACT

A method and system to interpret sensor transmission patterns to analyze anomalies in a smart environment include obtaining a map of the smart environment, the map including an indication of obstructions and openings. The method includes determining an initial location of each sensor of a plurality of sensors in the smart environment. Each sensor emits a transmission after each detection. The method also includes identifying an initial transmission pattern associated with each sensor, and identifying a change in the initial transmission pattern of a sensor among the plurality of sensors. The change is interpreted to determine whether the change in the initial transmission pattern of the sensor among the plurality of sensors is due to movement or obstruction of the sensor. Action is taken based on a determination that the sensor among the plurality of sensors is obstructed or removed.

15 Claims, 3 Drawing Sheets

(56) References Cited

U.S. PATENT DOCUMENTS

| | | |
|---|---|---|
| 2016/0171378 A1 | 6/2016 | Petersen et al. |
| 2016/0187127 A1* | 6/2016 | Purohit ............... G08B 29/046 |
| | | 702/150 |
| 2017/0067763 A1* | 3/2017 | Kodeswaran .......... G06N 7/005 |
| 2019/0212730 A1* | 7/2019 | Jones ................ G05B 19/4155 |

OTHER PUBLICATIONS

ElHady et al., "A Systematic Survey on Sensor Failure Detection and Fault-Tolerance in Ambient Assisted Living" Sensors 2018, 18, 1991 (Year: 2018).*

Kapitanova et al., "Being Smart About Failures: Assessing Repairs in Smart Homes" UbiComp '12, Sep. 5-Sep. 8, 2012, Pittsburgh, USA (Year: 2012).*

Ye et al., "Fault Detection for Binary Sensors in Smart Home Environments" 2015 IEEE International Conference on Pervasive Computing and Communications (PerCom) (Year: 2015).*

Lu et al., "Smart Blueprints: Automatically Generated Maps of Homes and the Devices Within Them" J. Kay et al. (Eds.): Pervasive 2012, LNCS 7319, pp. 125-142, 2012 (Year: 2012).*

Anonymous, "A Trust and Reliability Based Method Providing High Availability for Smart Sensor Environments", IPCOM000253053D, Mar. 1, 2018, pp. 1-4.

Anonymous, "Modular Multi-Sensor and Multi-Signal Processing System", IPCOM000190214D, Nov. 20, 2009, pp. 1-8.

* cited by examiner

INTERPRETING SENSOR TRANSMISSION PATTERNS TO ANALYZE ANOMALIES IN A SMART ENVIRONMENT

BACKGROUND

The present invention relates to a smart environment, and more specifically, to interpreting sensor transmission patterns to analyze anomalies in a smart environment.

The interconnection of sensors, actuators, computing devices, appliances, vehicles, and any other communication-capable objects via the internet is referred to as the internet of things (IoT). IoT devices are increasingly used for remote management and monitoring. For example, lights and appliances in a home can be controlled remotely based on a network of connected appliances and devices. Eldercare and, specifically, monitoring activities of daily living (ADLs) is also facilitated by interconnected actuators and sensors that convert a home to a digital home or, more generally, a smart environment.

SUMMARY

Embodiments of the present invention are directed to systems and methods to interpret sensor transmission patterns to analyze anomalies in a smart environment. The method includes obtaining a map of the smart environment, the map including an indication of obstructions and openings, and determining an initial location of each sensor of a plurality of sensors in the smart environment. Each sensor emits a transmission after each detection. The method also includes identifying an initial transmission pattern associated with each sensor, and identifying a change in the initial transmission pattern of a sensor among the plurality of sensors. The change is interpreted to determine whether the change in the initial transmission pattern of the sensor among the plurality of sensors is due to movement or obstruction of the sensor. Action is taken based on a determination that the sensor among the plurality of sensors is obstructed or removed.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

As previously noted, IoT devices can facilitate the monitoring of ADLs. Such monitoring can be especially helpful in the elderly or differently abled population, for example. An interconnected network of sensors (e.g., motion sensors, contact sensors, accelerometers, power sensors) allows the identification and monitoring of ADL patterns. Changes in these ADL patterns can be reported as potential indications of issues. As an example, a range of time between detection by two different motion sensors located along a hallway of a home can be established as indicating a general speed of travel of an occupant of the home. If that range of time is exceeded by some threshold amount, it can indicate that the occupant has suffered from a condition that affected their mobility. Thus, the change in the established speed can be reported.

When one or more sensors is moved or removed unexpectedly from a smart environment (e.g., by falling from its location), the lack of sensor measurements or change in sensor measurements can make it difficult to interpret sensor data and can generate false alarms with regard to changes in ADL patterns. A private home can have on the order of 30 to 40 sensors, while a group home can have around 700 sensors. Thus, simply indicating an issue without pinpointing the source or region of the issue can result in a lengthy and inefficient investigation of the cause of changes in the expected ADL patterns. Embodiments of the invention detailed herein relate to systems and methods for interpreting sensor transmission patterns to analyze anomalies in a smart environment.

Figure 1:
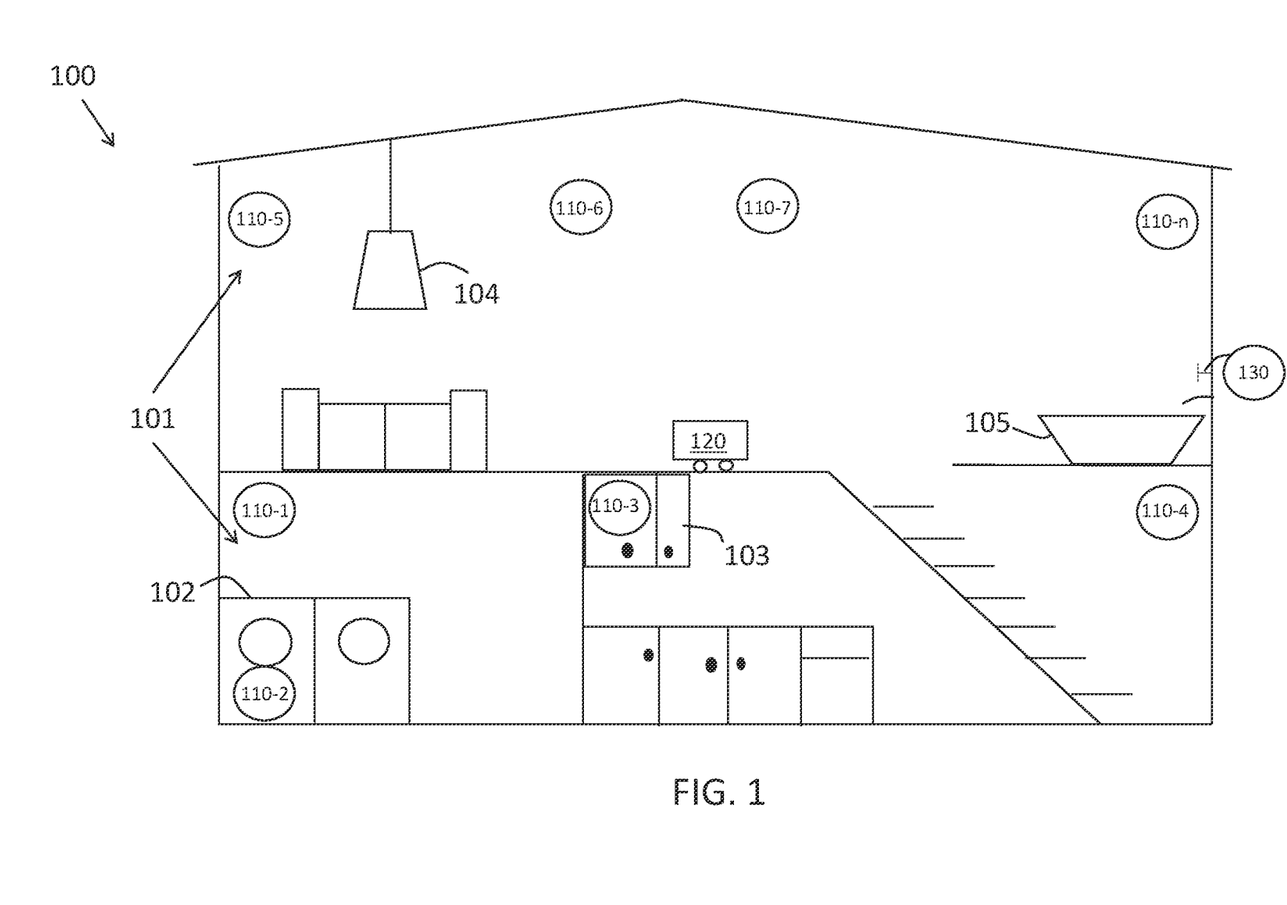
FIG. 1 is a cross-sectional view of an exemplary smart environment in which the interpretation of sensor transmission patterns is performed to analyze anomalies according to one or more embodiments of the invention.

FIG. 1 is a cross-sectional view of an exemplary smart environment 100 in which interpretation of sensor transmission patterns is performed to analyze anomalies according to one or more embodiments of the invention. The exemplary smart environment 100 is a home. The exemplary sensors 110-1 through 110-n (generally referred to as 110) can be different types of sensors 110. For example, sensors 110-1, 110-4, 110-5, and 110-7 can be motion sensors affixed to walls 101, sensor 110-2 can be an accelerometer that detects operation of the washing machine 102 to which it is affixed, sensor 110-3 can be a contact sensor on the doors of a cabinet 103 that indicates opening and closing of the doors, and sensor 110-6 can be a power sensor that indicates the operation of a light 104. An exemplary actuator 130 is also shown in FIG. 1. The actuator 130 controls water flow from a faucet into the tub 105. Each sensor 110 not only detects according to its type but also transmits when it detects. Each actuator 130 can also transmit when it actuates (e.g., an appliance, a faucet). For example, each of the sensors 110-1, 110-4, 110-5, and 110-7 transmits an identifier and a signal indicating detection when it has detected motion. These transmissions (also referred to as firings) make up the sensor transmission patterns that are learned and from which deviations are detected and analyzed. Sensor transmission pattern is understood to encompass detection or operation by all IoT devices (e.g., sensors 110, actuators 130, accelerometers).

A mapping of the physical space of the smart environment 100 is performed along with a determination of the placement of each of the sensors 110. The mapping of the physical space and the sensor 110 locations facilitate a determination of sensor transmission patterns. The map of the physical space can indicate obstructions (e.g., walls, furniture) and openings (e.g., doorways) in three-dimensional space. The mapping can be updated periodically or on an event-based basis. Subsequently, changes in the sensor transmission patterns can be analyzed and interpreted. Specifically, anomalies in the sensor transmission patterns that are due to sensors 110 (e.g., a sensor 110 being removed or moved) can be addressed efficiently.

The mapping of the physical space can be accomplished in a number of ways. For example, a person can carry a beacon that facilitates knowing their position while they locate the various sensors 110. As another example, a three-dimensional room scanner can be used. An exemplary mapping using a robot 120 is shown in FIG. 1. The robot 120 can navigate the physical space of the smart environment 100 and build a map that indicates obstructions such as furniture, for example. As previously noted, the mapping of the physical space of the smart environment 100 can be initiated periodically, manually (i.e., an operator knows of a change), or as a first step in the interpretation of a change in sensor transmission patterns, which is further discussed below.

According to exemplary embodiments of the invention, the robot 120 can also be used for active locating of some or all of the sensors 110. The active locating can be performed after the robot 120 is provided with or obtains a map of the physical space and learns the behavior of different types of sensors 110. The robot 120 can then take actions to have each type of sensor 110 detect and transmit (i.e., fire) in order to locate each sensor 110. The robot 120 can include receivers (e.g., Bluetooth, Zigbee, Z-wave) that can detect transmissions, which are broadcasts, from the sensors 110. The strength of the received signal can be used to determine a distance to the transmitting sensor 110. For example, a heat plate in the robot 120 can activate to cause passive infrared sensors 110 to fire. By noting its own position, according to the physical map, when a given sensor 110 fires, the robot 120 can estimate a location of the sensor 110 and can map the detection area or range of each passive infrared sensor 110. As other examples, the robot 120 can activate different lights 104 to locate power sensors 110 or move around the smart environment 100 to locate motion sensors 110. This active locating facilitates discovery of the sensors 110 in the smart environment 100 after initial setup or after modifications. Identification (i.e., mapping) of sensor transmission patterns based on the mapping of the physical space and location of the sensors 110 is discussed with reference to FIG. 3.

Figure 2:
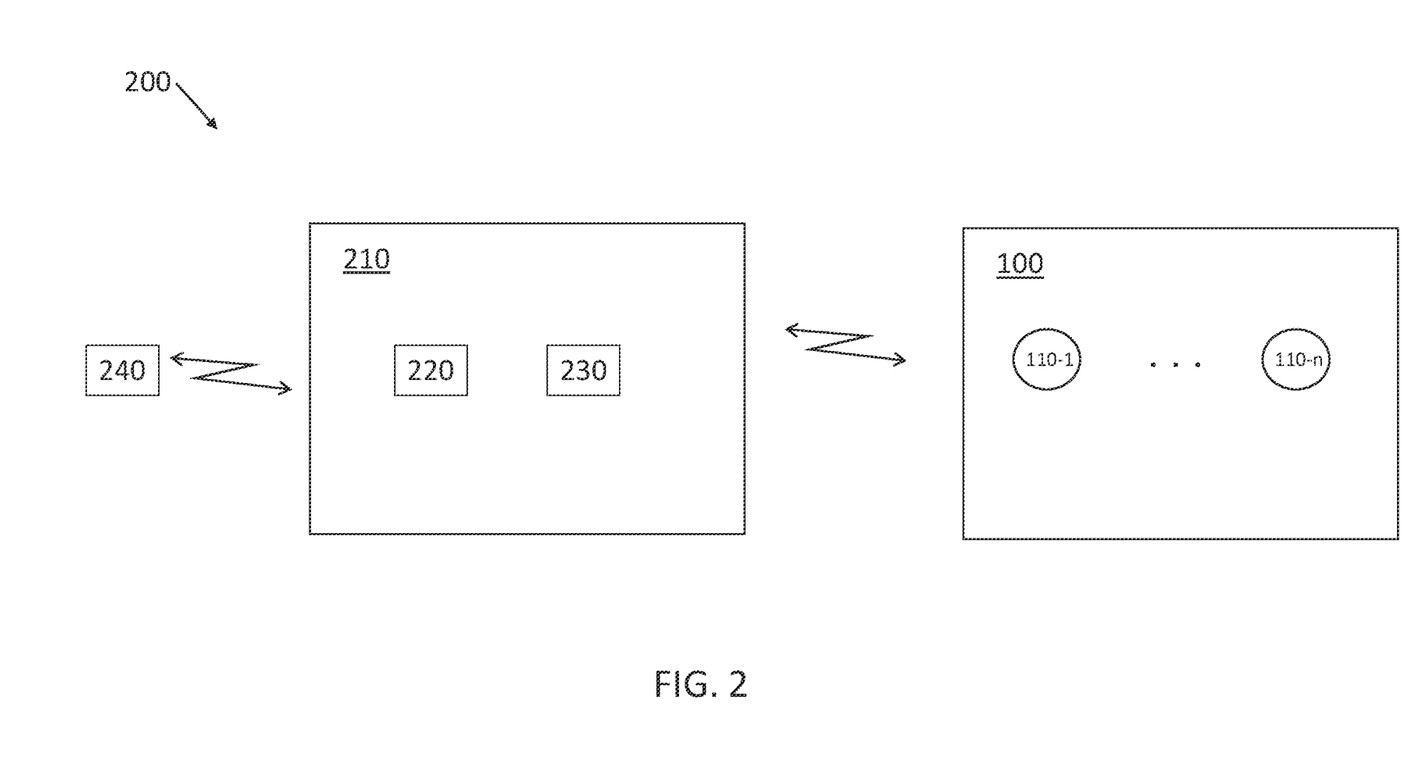
FIG. 2 is a block diagram of the system to perform interpretation of sensor transmission patterns to analyze anomalies according to one or more embodiments of the invention.

FIG. 2 is a block diagram of the system 200 to perform interpretation of sensor transmission patterns to analyze anomalies according to one or more embodiments of the invention. The various sensors 110 in the smart environment 100 communicate with a controller 210. According to an exemplary embodiment of the invention, the controller 210 can be co-located with the sensors 110 (e.g., controller 210 is in the smart home shown in FIG. 1). In alternate embodiments of the invention, the controller 210 can communicate with the sensors 110 of the smart environment 100 remotely. According to an exemplary embodiment of the invention, the controller 210 can map and interpret the sensor transmission patterns and communicate with a central controller 240 that issues alerts based on anomalies identified and interpreted in the sensor transmission patterns.

The central controller 240 can communicate with multiple controllers 210 that each monitor all or part of a smart environment 100. For example, multiple controllers 210, each associated with a smart environment 100 such as a smart home, can communicate with the central controller 240. As another example, when the smart environment 100 is a nursing home with hundreds of sensors 110, multiple controllers 210 can perform identification and interpretation of sensor transmission patterns, each for a subset of those sensors 110, and communicate information to the central controller 240. According to alternate embodiments of the invention, one or more controllers 210 and central controller 240 can work in combination to carry out the functionality detailed with reference to FIG. 3. The controller 210 includes processing circuitry such as, for example, one or more memory devices 230 and processors 220 to store and execute a computer program product. The processing circuitry of the controller 210 can implement machine learning or a rule-based approach according to different embodiments of the invention. The central controller 240 can include processing circuitry similar to that of the controller 210.

Figure 3:
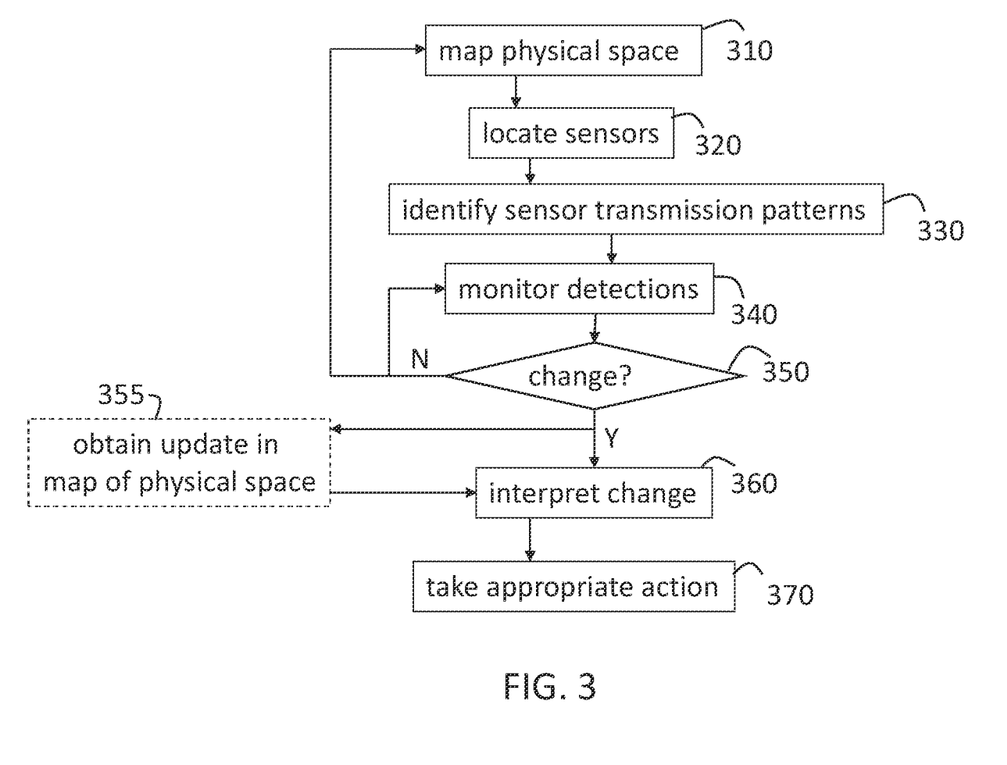
FIG. 3 is a process flow of a method of interpreting sensor transmission patterns to analyze anomalies in a smart environment according to one or more embodiments of the invention.

FIG. 3 is a process flow of a method of interpreting sensor transmission patterns to analyze anomalies in a smart environment 100 according to one or more embodiments of the invention. As detailed, sensor transmission patterns are determined and subsequent changes in those patterns are analyzed to identify issues with sensors 110 in the smart environment 100. At block 310, mapping the physical space of the smart environment 100 can be performed by a robot 120 according to an exemplary embodiment, as previously discussed. Locating the sensors 110, at block 320, can refer to active locating using the robot 120, as discussed with reference to FIG. 1. At block 330, identifying sensor transmission patterns relies on both the mapping of the physical space (at block 310) and the sensor 110 locations (at block 320). Machine learning can be used to learn the sensor transmission patterns. As previously noted, sensor transmission patterns can refer to not only the pattern of detection by sensors 110 but also the pattern of operation of other IoT devices (e.g., actuators 130, accelerometers).

Correlation metrics are collected from the sensors 110 over time to identify sensor transmission patterns. The correlation metrics include the transmission rate of each sensor 110 (i.e., how often the sensor 110 transmits in a given period such as a day), average duration of transmission of each sensor 110, and relative transmission rate of each sensor 110 (i.e., how often a given sensor 110 transmits over a period (e.g., day) divided by the total number of transmissions by all sensors 110). The correlation metrics also include bigrams and trigrams or, rather, the correlation metrics facilitate identification of bigrams and trigrams. A bigram is a pair of sensors 110 that are identified as having an ordered transmission pattern. Bigrams can be identified based on the fact that the two sensors 110 fire, in a particular order, within a given duration (e.g., 5 minutes) of each other. A high bigram count means that the two sensors 110 fire within the given duration frequently (e.g., more than a threshold number or percentage of their transmission are bigrams) while a low bigram count means that the two sensors 110 fire within the given duration less frequently (e.g., less than the threshold number or percentage).

Like an individual sensor 110, a bigram can also have a set average transmission duration and relative transmission rate. Multiple sets of bigrams can be identified within the same given duration. For example, if sensors 110-A, 110-B, and 110-C all fire, in that order, within 5 minutes of each other, then sensors 110-A and 110-B can be identified as one bigram, sensors 110-A and 110-C can be identified as a second bigram, and sensors 110-B and 110-C can be identified as a third bigram. To be clear, a bigram 110-B 110-C is different than a bigram 110-C 110-B, because the order of the transmission of each of the sensors is different.

The sensors 110 of a bigram can evidence a bigram offset or a set time difference (e.g., 2 minutes) between their transmission. For example, if sensors 110-A and 110-B are both motion sensors and are identified as a bigram with a bigram offset of 2 minutes, it suggests that a person in the smart environment 100 moves between sensor 110-A and sensor 110-B in 2 minutes. As further discussed with reference to block 350, if that pattern changes (e.g., 5 minutes between detection by sensor 110-A and sensor 110-B), it can suggest an issue with the mobility of the person. However, an alert regarding mobility can be a false alarm if sensor 110-B were moved farther from sensor 110-A or if the room were rearranged (e.g., sofa moved between the sensors 110) to create an obstruction between sensor 110-A and 110-B that requires a more circuitous route between the two sensors 110.

Similarly to the bigrams discussed above, trigrams can also be identified, at block 330. Trigrams are a set of three sensors 110 that are identified as having a combined transmission pattern. Trigrams can be identified based on the fact that the three sensors 110 transmit in a particular order within a given duration (e.g., 8 minutes) of each other. As previously discussed for bigrams, sensors 110 can have a high or low trigram count. Like an individual sensor 110, a trigram can also have a set average transmission duration and relative transmission rate. Multiple sets of trigrams can be identified within the same given duration. For example, if sensors 110-A, 110-B, 110-C, and 110-D all fire, in that order, within 8 minutes of each other, then sensors 110-A, 110-B, and 110-C can be identified as one trigram, sensors 110-A, 110-B, and 110-D can be identified as a second trigram, sensors 110-B, 110-C, and 110-D can be identified as a third trigram, and sensors 110-A, 110-C, and 110-D can be identified as a fourth trigram. While bigrams and trigrams have been detailed for explanatory purposes, the system 200 can identify a pattern of any number of sensors 110 that fire in a particular order within a defined duration. Generally, these patterns of sets of sensors 110 can be referred to as n-grams.

At block 340, monitoring detections by the sensors 110 (and operation of other IoT devices) facilitate determining, at block 350, if there is any change in a previously identified pattern (from block 330). If not, the monitoring (at block 340) is continued. If there is a change in the sensor transmission pattern determined at block 350 (i.e., an anomaly detected in the smart environment 100), then, optionally, at block 355, the processes can include obtaining an update in the map of the physical space. At block 360, interpreting the anomaly can be performed using machine learning.

If an updated map of the physical space is obtained, at block 355, and if it indicates a change from the previous map, it can be determined if the change in sensor transmission pattern detected at block 350 is related to the change in the physical space. For example, if a piece of furniture is indicated as being moved, and the move corresponds with a change in transmission patterns by a given sensor, the controller 210 can interpret that the given sensor is attached to the piece of furniture that was moved and, thus, has also moved. As another example, if furniture were moved, as indicated by the updated map, a previously identified bigram can be disrupted. The change in physical space can increase the time to traverse the space between two motion detectors that made up the sensors 110 of the bigram, for example. As a result, the two sensors 110 may no longer fire within the period of time (e.g., 5 minutes) required to identify a bigram.

This interpretation can be facilitated by using a three-dimensional model. That is, a three-dimensional model of the space of the smart environment 100 can be constructed using the mapping information (at block 310) and, if available, the updated mapping information. This three-dimensional model can include the detection zones of each sensor 110. According to this exemplary embodiment of the invention, the model can indicate that a detection zone of a sensor 110 is blocked (e.g., by furniture that is part of the mapped model) or that an unobstructed distance between the detection zones of two sensors 110 is increased.

Generally, the interpretation, at block 360, must consider whether the change in transmission pattern indicates that an IoT device (e.g., a sensor 110, an actuator 130) has been moved, blocked, or unblocked or if there has been a change in behavior of an occupant of the smart environment 100 or both. For example, if a sensor 110-$x$ previously had high bigram and trigram counts with a first set of sensors 110 and low bigram and trigram counts with a second set of sensors 110 but then exhibits low bigram and trigram counts with the first set of sensors 110 and high bigram and trigram counts with the second set of sensors 110, then the controller 210 can interpret the change as indicating that the sensor 110-$x$ was moved closer to the second set of sensors 110.

If a given sensor 110-$y$ begins transmitting more frequently but other sensors 110 in its vicinity or in an n-gram that includes sensor 110-$y$ are not also transmitting more frequently, then the controller 210 can interpret the change as indicating that the sensor 110-$y$ had been partially or almost completely blocked (e.g., by furniture) but is no longer blocked. Similarly, if a given sensor 110-$w$ begins transmitting less frequently but other sensors 110 in its vicinity or in an n-gram with the sensor 110-$w$ are not transmitting less frequently, then the controller can interpret the change as indicating that the sensor 110-$w$ is now blocked by furniture or another obstruction. As an extension of this example, if a given sensor 110-$m$ stops transmitting entirely while nearby sensors 110 or sensors 110 that in an n-gram are still transmitting, then the sensor 110-$m$ can be interpreted by the controller 210 as being removed (e.g., put in a closed drawer, having its power source removed (e.g., battery died)). When the controller 210 detects a new cluster of transmissions (e.g., new bigrams or trigrams), it can interpret the new cluster of transmissions as the addition or move of a sensor 110 to a new location. That is, without an updated map of the physical space (at block 355), the transmission patterns themselves can be used, at block 360, to interpret the changes detected at block 350.

At block 370, taking appropriate action refers to the controller 210 determining the best course according to the interpretation (at block 360). If a sensor 110 is interpreted to have been moved, obstructed, or removed, the controller 210 can notify the central controller 240 or an operator of the location (e.g., original location from which the sensor 110 was moved or removed, new location based on new transmissions) to ensure that the sensor 110 mapping is updated or a sensor 110 that was removed is replaced. Based on infrared or motion sensors 110, the controller 210 can identify the closest person to alert regarding an anomaly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of interpreting sensor transmission patterns to analyze anomalies in a smart environment, the method comprising:
    obtaining a map of the smart environment, the map including an indication of obstructions and openings;
    determining an initial location of each sensor of a plurality of sensors in the smart environment, wherein each sensor of the plurality of sensors emits a transmission after a detection, wherein the determining the initial location of each sensor of the plurality of sensors in the smart environment includes performing active locating based on a robot causing a broadcast by one or more sensors of the plurality of sensors while the robot is at known locations, the one or more sensors including an infrared sensor and the active locating including the robot activating a heat plate to cause the broadcast by the infrared sensor;
    identifying an initial transmission pattern associated with each sensor of the plurality of sensors;
    identifying a change in the initial transmission pattern of a sensor among the plurality of sensors;
    interpreting the change to determine whether the change in the initial transmission pattern of the sensor among the plurality of sensors is due to movement or obstruction of the sensor; and
    taking action based on a determination that the sensor among the plurality of sensors is obstructed or removed.

2. The computer-implemented method according to claim 1, wherein the identifying the initial transmission pattern associated with each sensor of the plurality of sensors includes identifying the sensor as being part of a bigram with a second sensor of the plurality of sensors, the bigram meaning that the sensor and the second sensor transmit within a threshold period of time of each other.

3. The computer-implemented method according to claim 2, wherein the interpreting the change includes determining that the sensor has been moved from the initial location of the sensor based on the sensor being part of a second bigram with a third sensor of the plurality of sensors and the initial location of the third sensor being in a different part of the smart environment than the initial location of the sensor.

4. The computer-implemented method according to claim 1, wherein the identifying the initial transmission pattern associated with each sensor of the plurality of sensors includes identifying the sensor as being part of a trigram, the trigram being a set of three sensors that transmit within a threshold period of time of each other.

5. The computer-implemented method according to claim 1, wherein the interpreting the change includes determining that the sensor has been obstructed or removed based on a frequency of the transmissions of the sensor decreasing or becoming zero.

6. A system to interpret sensor transmission patterns to analyze anomalies in a smart environment, the system comprising:
    a plurality of sensors, wherein each sensor of the plurality of sensors emits a transmission after a detection;
    a controller configured to store an initial location of each sensor of the plurality of sensors in the smart environment, to obtain a map of the smart environment, the map including an indication of obstructions and openings, to identify an initial transmission pattern associated with each sensor of the plurality of sensors, to identify a change in the initial transmission pattern of a sensor among the plurality of sensors, to interpret the change to determine whether the change in the initial transmission pattern of the sensor among the plurality of sensors is due to movement or obstruction of the sensor, and to take action based on a determination that the sensor among the plurality of sensors is obstructed or removed; and
    a robot configured to determine the initial location of one or more sensors of the plurality of sensors in the smart environment by performing active locating based on the robot causing a broadcast by one or more sensors of the plurality of sensors while the robot is at known locations, wherein the one or more sensors includes an infrared sensor and the active locating includes the robot activating a heat plate to cause the broadcast by the infrared sensor.

7. The system according to claim 6, wherein the controller is configured to identify the initial transmission pattern associated with each sensor of the plurality of sensors based on identifying the sensor as being part of a bigram with a second sensor of the plurality of sensors, the bigram meaning that the sensor and the second sensor transmit within a threshold period of time of each other.

8. The system according to claim 7, wherein the controller is configured to interpret the change by determining that the sensor has been moved from the initial location of the sensor based on the sensor being part of a second bigram with a third sensor of the plurality of sensors and the initial location of the third sensor being in a different part of the smart environment than the initial location of the sensor.

9. The system according to claim 6, wherein the controller is configured to identify the initial transmission pattern associated with each sensor of the plurality of sensors based on identifying the sensor as being part of a trigram, the trigram being a set of three sensors that transmit within a threshold period of time of each other.

10. The system according to claim 6, wherein the controller is configured to interpret the change by determining that the sensor has been obstructed or removed based on a frequency of the transmissions of the sensor decreasing or becoming zero.

11. A computer program product for interpreting sensor transmission patterns to analyze anomalies in a smart environment, the computer program product comprising a computer readable storage medium having program instructions embodied therewith, the program instructions executable by a processor to perform a method comprising:
- obtaining a map of the smart environment, the map including an indication of obstructions and openings;
- determining an initial location of each sensor of a plurality of sensors in the smart environment, wherein each sensor of the plurality of sensors emits a transmission after a detection, wherein the determining the initial location of each sensor of the plurality of sensors in the smart environment includes performing active locating based on a robot causing a broadcast by one or more sensors of the plurality of sensors while the robot is at known locations, the one or more sensors including an infrared sensor and the active locating including the robot activating a heat plate to cause the broadcast by the infrared sensor;
- identifying an initial transmission pattern associated with each sensor of the plurality of sensors;
- identifying a change in the initial transmission pattern of a sensor among the plurality of sensors;
- interpreting the change to determine whether the change in the initial transmission pattern of the sensor among the plurality of sensors is due to movement or obstruction of the sensor; and
- taking action based on a determination that the sensor among the plurality of sensors is obstructed or removed.

12. The computer program product according to claim 11, wherein the identifying the initial transmission pattern associated with each sensor of the plurality of sensors includes identifying the sensor as being part of a bigram with a second sensor of the plurality of sensors, the bigram meaning that the sensor and the second sensor transmit within a threshold period of time of each other.

13. The computer program product according to claim 12, wherein the interpreting the change includes determining that the sensor has been moved from the initial location of the sensor based on the sensor being part of a second bigram with a third sensor of the plurality of sensors and the initial location of the third sensor being in a different part of the smart environment than the initial location of the sensor.

14. The computer program product according to claim 11, wherein the identifying the initial transmission pattern associated with each sensor of the plurality of sensors includes identifying the sensor as being part of a trigram, the trigram being a set of three sensors that transmit within a threshold period of time of each other.

15. The computer program product according to claim 11, wherein the interpreting the change includes determining that the sensor has been obstructed or removed based on a frequency of the transmissions of the sensor decreasing or becoming zero.

* * * * *